July 31, 1956     W. S. TANDLER ET AL     2,756,510
AUTOMATIC ABSOLUTE DIMENSION GAUGE Filed Sept. 30, 1949     2 Sheets-Sheet 2

INVENTORS
William S. Tandler
David S. Walker
Morris Grossman
BY Arthur Sloan

Campbell, Brumbaugh, Free
          + Graves
their Attorneys

United States Patent Office 2,756,510
Patented July 31, 1956

2,756,510

AUTOMATIC ABSOLUTE DIMENSION GAUGE

William S. Tandler, David S. Walker, Morris Grossman, and Arthur Sloan, New York, N. Y., assignors, by mesne assignments, to The Warner & Swasey Research Corporation, Cleveland, Ohio, a corporation of Ohio Application September 30, 1949, Serial No. 118,932

3 Claims. (Cl. 33—174)

This invention relates to gauging apparatus and more particularly to new and improved gauges for determining distances from a reference datum to points on an object whose contour or shape is not exactly known.

The copending application, Serial No. 16,536, filed March 23, 1948, now Patent No. 2,697,879, patented December 28, 1954, by William S. Tandler, David S. Walker and Morris Grossman discloses a number of different forms of gauging apparatus for determining deviations in the contour of a part from specifications. If the nominal contour of the part is known, other like parts can be easily gauged with this apparatus and their deviations from the nominal contour can be effectively and accurately determined. Sometimes, however, the nominal outline of a part is not known, as where no drawing or other standard for comparison exists, for example. The shape or contour of single parts in this category having simple regular shapes can, of course, be easily determined. But no suitable apparatus has been available, heretofore, for determining quickly and accurately the shape or contour of such a part which is formed with cavities, undercuts, irregular surfaces, or the like.

It is an object of the invention, accordingly, to provide new and improved gauging apparatus which is capable of determining to a high degree of accuracy the contour or shape of an object of unknown contour or shape which is formed with undercuts, cavities, irregular surfaces or the like, although it is not limited to such use.

Another object of the invention is to provide new and improved gauging apparatus of the above character which is highly flexible in operation and which requires a minimum of advance preparation prior to the making of a gauging measurement on a part.

Still another object of the invention is to provide new and improved gauging apparatus of the above character which is adapted to provide accurate indications of distances from a reference datum to points on the surface of an object whose contour or shape is to be determined.

A further object of the invention is to provide new and improved gauging apparatus of the above character by means of which the shape or contour of an object having an axis of rotation may be accurately determined.

Still another object of the invention is to provide new and improved gauging apparatus of the above character which enables accurate indications to be obtained of displacements such as the displacement of a tappet by a cam, for example.

Yet another object of the invention is to provide new and improved gauging apparatus of the above character which is automatic in operation and which makes an accurate record of the measurements.

In accordance with the invention, gauging apparatus is provided which comprises resilient gauging probe means adapted to be advanced towards and to engage the surface of an object to be gauged, together with recorder means and a record strip that are adapted to be moved relatively to one another in accurately timed relation to the movement of the gauging probe means. Upon engagement of the probe means with the surface of the object being gauged, the recording means is actuated, and records on the record strip. The relative displacement between the recording means and the record strip from an accurately established reference datum to the position where the recording means is actuated is taken as a measure of the distance from a reference datum to a point on the surface of the object being gauged. Records are made at a plurality of stations on the object so that its shape or contour can be accurately determined.

In one embodiment, the probe means is automatically advanced towards the test object at each station, is retracted after each record is made and is then moved to the next station. Means is also provided for gauging points on opposite sides of the test object.

Where the part to be gauged has an axis of rotation as in the case of a cam, for example, means may be provided for turning it to different angular stations at each of which the distance from a reference datum to the surface of the object is accurately measured. Provision may also be made for the measurement of displacements such as the displacement of a tappet by a cam, for example.

The invention may be better understood from the following detailed description of several typical embodiments thereof taken in conjunction with the accompanying drawings in which.

Figure 1:
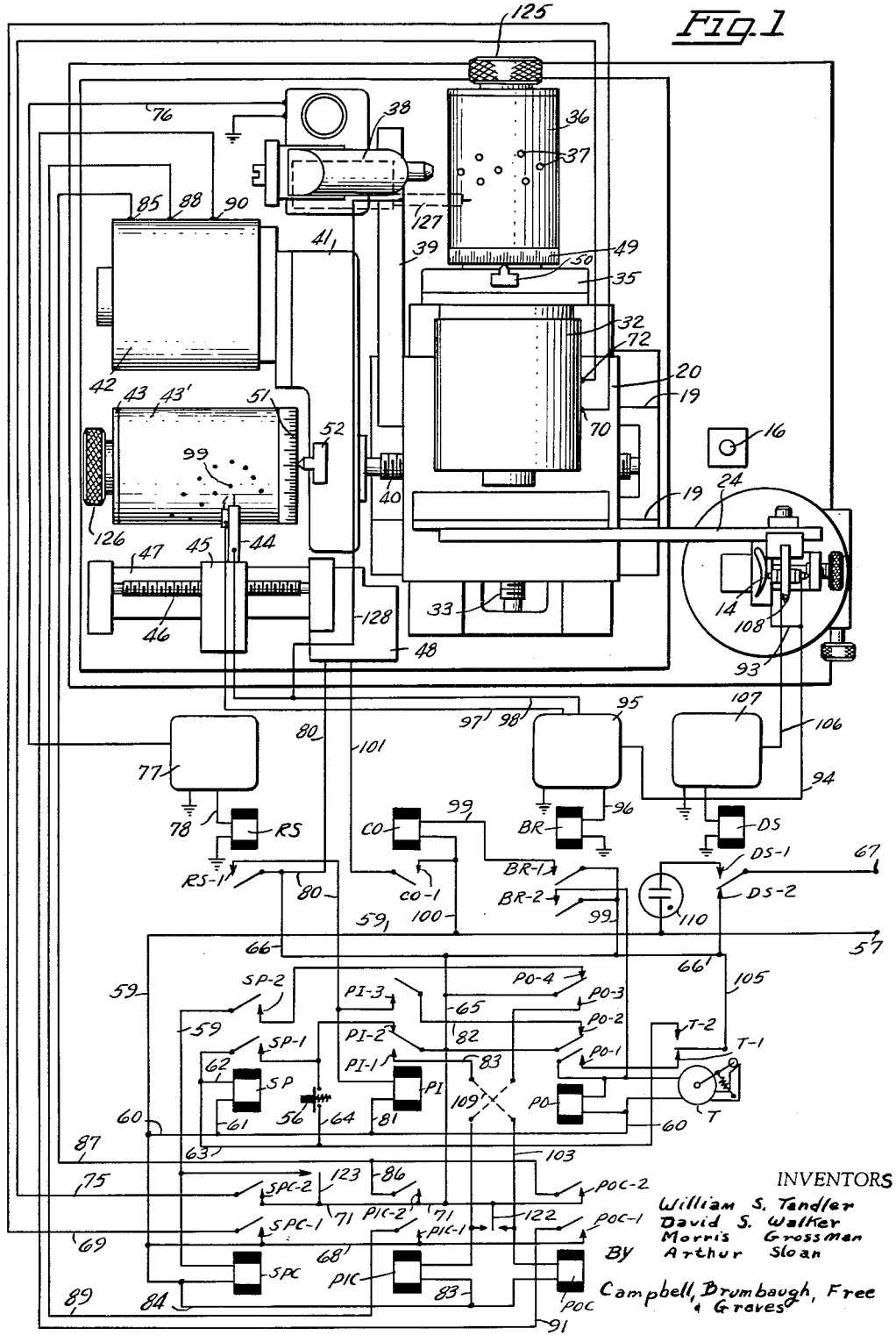
Fig. 1 is a schematic diagram of gauging apparatus constructed according to the invention together with a typical control system therefor.
Figure 2:
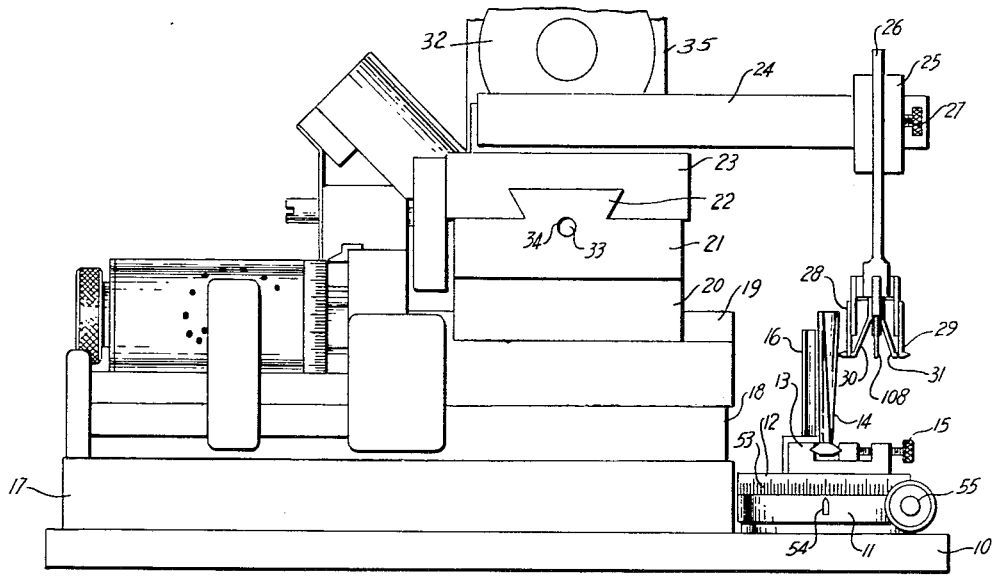
Fig. 2 is a view in elevation of the gauging apparatus shown in Fig. 1.

Referring now to Figs. 1 and 2, a typical form of gauging apparatus is shown which may comprise, for example, a bed plate 10 on which is secured a base member 11 carrying a rotatable support 12 for a vise 13 or the like in which a test piece 14 such as a turbine blade, for example, is adapted to be received. In order to facilitate the insertion and removal of a test piece 14, the vise 13 may be provided with an adjustable clamp 15. The vise 13 also carries a hardened gauge pin 16 which is very accurately ground to a known diameter and which serves to line up the several probes of the gauging apparatus as will be described in greater detail below.

The bed plate 10 also carries a base 17 which supports a block 18 formed with parallel ways 19 on which an offset or Y axis carriage 20 is slidably mounted. Secured to the offset carriage 20 is a block 21 formed with ways 22 on which a station or X axis carriage 23 is slidably mounted for movement in a direction perpendicular to the movement of the offset carriage 20.

The station carriage 23 supports an arm 24 having a slide 25 near one end thereof in which a probe carrier 26 is adapted to be slidably received. The probe carrier 26 may be securely retained in any desired position in the slide 25 by means of a suitable clamp 27, for example.

Mounted on opposite sides of the bottom end of the probe carrier 26 and insulated therefrom are a pair of probes 28 and 29 which are preferably resilient, although nonresilient probes can be used, and which are adapted to be moved into engagement with one side or the other of the test piece 14 during the gauging operation. Preferably the tips of the probes should approach a point in size and in a practical case they may have a radius of say, .001″. Also secured on the probe carrier 26 at a position intermediate the probes 28 and 29 are a pair of safety feelers 30 and 31, the tips of which normally lie a short distance directly behind the corresponding probes 28 and 29, respectively. The feelers 30 and 31 serve to stop further movement of the arm 24 whenever either of the probes 28 or 29 is bent too far backward upon engagement with the test piece 14, as will be explained in what follows below.

The station carriage 23 is adapted to be moved on the ways 22 by means of a station motor 32 which is supported on the station carriage 23. The carriage 23 engages a lead screw 33 which is journalled in the block 21, the lead screw 33 being driven by the motor 32 in any suitable manner as through a gear box 35 (Fig. 1), for example.

The motor 32 also drives a station drum 36 which carries a plurality of indicia 37 corresponding to the several stations at which the measurements are to be made. The indicia 37 may be formed in any suitable manner as by drilling small holes into the drum 36, for example, and they are adapted to be scanned by a conventional photoelectric scanner 38 mounted on an arm 39 secured on the offset carriage 20 for movement therewith longitudinally of the drum 36. The drum 36 may be provided with an adjusting knob 125 or the like by means of which it may be rotated to different positions, as desired.

The offset carriage 20 is adapted to be driven by means of a lead screw 40 through a suitable gear box 41 powered by an offset motor 42. The motor 42 also drives a record drum 43 on which a suitable record strip 43′ such as Teledeltos paper, for example, is adapted to be mounted for recording the gauging measurements. Recording may be accomplished, for example, by means of a stylus 44 secured on a carriage 45 engaging a lead screw 46 journalled in a frame 47. The lead screw 46 may be driven by a conventional electrically operated ratchet mechanism 48, or the like, to move the stylus 44 laterally one step each time the gauging station is changed, as will be described in greater detail hereinafter. The record drum 43 may also be provided with an adjustable knob 126 or the like by means of which it can be rotated to various positions, as desired.

Preferably the station drum 36 is provided with calibrated markings 49 adjacent one end thereof which are adapted to cooperate with an index marker 50 in order that direct readings of the station positions may be obtained. In similar fashion, the record drum 43 is provided with calibrated markings 51 which are adapted to cooperate with an indexing marker 52 to enable offsets of the contour of the test part 14 to be read directly. The rotatable support 12 for the anvil 13 may also be provided with calibrated markings 53 and an indexing marker 54 may be formed on the base 11 in order that the angular position of the piece 14 may be determined. Further, any suitable means 55, for example, may be provided for rotating the support 12.

*The electrical control system*

For automatic operation, an electrical control system may be provided as shown in Fig. 1, which may best be illustrated by describing a typical sequence of operations involved in automatically gauging a part with the novel gauging apparatus of the invention.

In what follows, it will be assumed that the probe assembly lies in the position shown in Figs. 1 and 2 and that the probe selector switch 109 is in the proper position for gauging the surface of the test part 14 away from the apparatus.

Operation of the gauging apparatus is initiated by pressing the start button 56 (Fig. 1). This completes a circuit which is traced from one supply means terminal 57 through the conductors 59, 60 and 61, the station holding relay SP, the conductors 62, 63 and 64, closed start button 56, normally closed contacts PI–2 of the probe-in holding relay PI, the conductors 65 and 66 and normally closed contacts DS–2 of the safety relay DS to the other supply mains terminal 67. This energizes the station holding relay SP and closes its contacts SP–1 and SP–2.

The closing of the contacts SP–1 short-circuits the start button 56 and thus maintains the station holding relay SP energized when the start button 56 is released. The closing of the contacts SP–2 completes a circuit from the supply mains terminal 57 through the conductor 59, the station-forward contactor relay SPC, the closed relay contacts SP–2, the normally closed contacts PO–4 on the probe-out holding relay PO, the conductors 65 and 66 and the normally closed relay contacts DS–2 to the other supply mains terminal 67. This energizes the station-forward contactor relay SPC, closing its contacts SPC–1 and SPC–2.

The closing of the contacts SPC–1 completes a circuit from the supply mains terminal 57 through the conductors 59 and 68, the closed relay contacts SPC–1 and the conductor 69 to the terminal 70 of the station motor 32. In similar fashion, the closing of the relay contacts SPC–2 completes a circuit which is traced from the supply mains terminal 67 through the normally closed relay contacts DS–2, the conductors 66, 65 and 71, the closed contacts SPC–2 and a conductor 75 to another terminal 72 on the station motor 32. Upon completion of these circuits, the station motor 32 begins to rotate and drives the station carriage 23 in the forward direction.

The station motor 32 also drives the station drum 36 until the indicium 37 corresponding to the first gauging station comes into the field of view of the scanning mechanism 38. When this occurs, an electric signal is produced which is transmitted through the conductor 76 to one terminal of a conventional amplifier 77, the other terminal of which is grounded, the other output terminal of the scanning mechanism 38 also being grounded. This completes an output circuit through the conductor 78 and the station relay RS to ground, the other output terminal of the amplifier 77 also being grounded. Thus, the station relay RS is energized and its contacts RS–1 are closed.

The closing of the relay contacts RS–1 connects the supply mains terminal 67 to one terminal of the probe-in holding relay PI, through the closed relay contacts DS–2, the conductor 66, the closed relay contacts RS–1 and the conductor 80, the other terminal of the relay PI being connected through the conductors 81, 60 and 59 to the other supply mains terminal 57. The relay PI thus is energized, closing its contacts PI–1 and PI–3 and opening its contacts PI–2.

The closing of the contacts PI–3 connects the conductor 80 directly to the conductor 66, through the conductor 82, the normally closed contacts PO–2 on the probe-out holding relay PO and the conductor 65, thus maintaining the relay PI energized after the station-relay RS is deenergized.

The closing of the contacts PI–1 connects one terminal of the probe-in contactor relay PIC to the supply mains terminal 67 through the closed relay contacts DS–2, the conductors 66 and 65, the closed relay contact PI–1, the conductor 83, and the probe selector switch 109, the other terminal of the relay PIC being connected to the other supply mains terminal 57, through the conductors 84 and 59. Thus, the relay PIC is now energized.

The opening of the relay contacts PI–2 breaks the circuit to the station holding relay SP so that its contacts SP–1 and SP–2 open. The opening of the relay contacts SP-2 deenergizes the station-forward contactor relay SPC and consequently deenergizes the motor 32 so that the station carriage 23 comes to rest with the gauging probe 28 ready to gauge the contour of the test part 14 at the first station.

Upon energization of the probe-in contact relay PIC, the contacts PIC-1 and PIC-2 are closed.

The closing of the contacts PIC-2 connects one terminal 85 of the offset motor 42 to the supply mains terminal 67, through the closed relay contacts DS-2, the conductors 66, 65 and 71, the closed relay contacts PIC-2, and the conductors 86 and 87. Simultaneously, the closing of the contacts PIC-1 connects a second terminal 88 of the offset motor 42 to the supply mains terminal 57, through the conductors 59 and 68, the closed relay contacts PIC-1 and the conductor 89. The offset motor 42 now begins to rotate and drives the offset carriage 20 in the direction to bring the probe 28 on the probe holder 26 into engagement with the test piece 14. The record drum 43 is also rotated in synchronism with the movement of the offset carriage 20.

Upon engagement of the probe 28 with the test piece 14, a circuit is completed through the conductor 94 to one terminal of a conventional amplifier 95, both the test piece 14 and the other amplifier terminal being grounded. This applies a signal to the input of the amplifier 95, thereby supplying electrical energy to an output circuit comprising a conductor 96 and the probe relay BR. This energizes the probe relay BR, closing its contacts BR-1 and BR-2. Simultaneously, the amplifier 95 supplies an output signal through a conductor 98 and ground to the stylus 44 causing a mark 99 to be produced on the Teledeltos strip 43' on the record drum 43, the record strip 43' also being grounded through the drum 43.

The closing of the relay contacts BR-1 connects one terminal of the offset ratchet contactor relay CO to the supply mains terminal 67 through the closed relay contacts DS-2, the conductors 66 and 99, and the closed relay contacts BR-1, the other terminal of the relay CO being connected to the supply mains terminal 57 through the conductors 59 and 100. This energizes the relay CO closing its contacts CO-1.

The closing of the contacts CO-1 connects one terminal of the electrically operated ratchet mechanism 48 to the supply mains terminal 57, through the conductors 59 and 100, closed relay contacts CO-1 and the conductor 101, the other terminal of the ratchet mechanism 48 being connected to the supply mains terminal 67 through the closed relay contacts DS-2 and the conductors 66 and 80. This energizes the ratchet mechanism 48 and causes the stylus 44 to step over to a new position on the record strip 43' carried by the record drum 43.

The closing of the relay contacts BR-2 connects one terminal of the probe-out holding relay PO to the supply mains terminal 67 through the closed relay contacts DS-2, the conductors 66 and 99, the closed relay contacts BR-2 and the conductor 102, the other terminal of the relay PO being connected to the supply mains terminal 57, through the conductors 59 and 60, thus energizing the relay PO. The completion of this circuit simultaneously energizes a motor drive for a timer mechanism T which is connected in parallel with the relay PO.

Upon energization of the relay PO, the contacts PO-1 and PO-3 are closed while the contacts PO-2 and PO-4 are opened. The closing of the contacts PO-1 connects one side of the relay PO directly to the conductor 66, through the closed contacts T-1 on the timer mechanism T and a conductor 105.

The opening of the contacts PO-2 breaks the circuit to the probe-in holding relay PI which in turn deenergizes the probe-in contactor relay PIC by the opening of its contacts PI-1.

The closing of the contacts PO-3 connects one terminal of the probe-out contactor relay POC to the supply mains terminal 67, through the closed relay contacts DS-2, the conductors 66, 65, 59, closed contacts PO-3, probe selector switch 109, and a conductor 103, the other terminal of the relay POC being connected to the supply mains terminal 57 through the conductors 59 and 84. This energizes the relay POC, closing its contacts POC-1 and POC-2.

With the relay contacts POC-1 and POC-2 closed the motor terminals 85 and 90 are connected to the supply mains terminals 57 and 67 so that the offset motor 42 rotates in the reverse direction and moves the probe 28 out of engagement with the test piece 14, simultaneously rotating the record drum in the reverse direction.

After a predetermined time interval has elapsed, the timing mechanism T operates, disengaging the contacts T-1 and causing engagement of the contacts T-2. Disengagement of the contacts T-1 deenergizes the probe-out holding relay PO causing its contacts PO-1 and PO-3 to open and its contacts PO-2 and PO-4 to close. The opening of the relay contacts PO-3 in turn deenergizes the probe-out contactor relay POC so that its contacts POC-1 and POC-2 open. This deenergizes the offset motor 42 so that the offset carriage 20 and the record drum 43 come to rest.

The closing of the timer contacts T-2 connects one terminal of the station holding relay SP to the supply mains terminal 67 through the closed relay contacts DS-2, the conductor 105, the closed contacts T-2 and the conductor 63, the other terminal of the relay SP being connected to the supply mains terminal 57, through conductors 59, 60 and 61. Upon energization of the station holding relay SP, the cycle of operations described above is repeated until gauging measurements have been completed at all stations corresponding to the indicia 37 on the station drum 36.

The purpose of the safety feelers 30 and 31 (Fig. 2) is to prevent damage to the probes 28 and 29 by their being bent too far back upon engagement with the test piece 14. To this end, the feelers 30 and 31 are connected by a conductor 106 to one terminal of a conventional D. C. amplifier 107, the output of which is adapted to energize the safety relay DS whenever either feeler 30 or 31 engages either probe 28 or 29, respectively. Energization of the safety relay DS opens its contacts DS-2 and closes its contacts DS-1. With the opening of the contacts DS-2, all of the relays in the control system are immediately disconnected from the supply mains terminal 67 so that the system is rendered inoperative. At the same time, the closing of the contacts DS-1 connects a signalling light 110 to the supply mains terminal 57 and 67, thus indicating that the control system is inoperative.

*Adjustment and calibration*

The gauging apparatus may be calibrated by accurately determining the positions of the record drum 43 at the instant the probes 28 and 29 engage the gauge pin 16 in their respective directions of movement. As indicated above, the gauge pin 16 is a very accurate, hardened and ground pin of known diameter. For practical purposes, the diameter of the pin 16 is preferably made to correspond to an integral number of revolutions of the record drum 43, i. e., if one revolution of the record drum produces 10" of circumferential movement and the amplification on the record is 100 to 1, the probe movement would be .01", in which case the diameter of the gauge pin 16 might be made a multiple of .01".

Calibration of the apparatus may be accomplished by first moving the probe 29 towards the center of the gauge pin 16 until it comes into engagement with the latter, at which time a mark A (Fig. 3) is automatically made on the record strip 43' carried by the record drum 43. The center of the pin 16 may be determined in any suitable manner as by locating two gauging stations at which the offsets recorded on the record strip are equal and then setting the drum 36 to a station exactly half way between those two stations. The reading of the calibrated scale 51 at the position of the indexing member 52 when the mark A is made may also be observed. The probe 28 is then moved in its measuring direction towards the center of the gauge pin 16, determined as described above, for example, and a similar mark B (Fig. 3) is made on the record strip 43' when the probe 28 engages the test piece 14. The reading of the calibrated scale 51 at the level of the indexing member 52 when the mark B is made may also be observed.

It will be understood that the mark B made by the probe 28 in this fashion will serve as a reference datum for offset measurements made with this probe, while the mark A corresponding to the probe 29 will serve as a reference datum for offset measurements made with that probe. Similarly, the readings of the calibrated scale 51 at the times the marks B and A are made can serve as reference data for the probes 28 and 29, respectively. Since the diameter of the pin 16 corresponds to an integral number of revolutions of the drum 43, this setting takes care of all referencings for the base lines and of any play which may occur in the lead screw 40.

In some cases, as where turbine blades are to be gauged, for example, it is desirable also to determine the location of the leading edge of the blade so that the station measurements may be referred to this point. This may be accomplished by means of a center probe 108 which is electrically connected to the conductor 106 (Figs. 1 and 2). By manually operating the offset motor 42 and the station motor 32 by the switches 123 and 122, or by manipulating the knobs 125 and 126, the center probe 108 can be brought into engagement with the leading edge of the test piece 14 at a plurality of different offset positions. Each time this occurs, the signalling lamp 110 will be lighted at the instant of engagement. In this fashion, the minimum station distance to the blade can be readily determined. The reading on the calibrated scale 49 carried by the station drum 36 at the position of the indexing member 50 for the minimum station distance then accurately locates the leading edge of the test piece 14 relatively to the station indicia 37. The determination of the minimum station distance to the nearest point of the blade 14 may be facilitated by using a cylindrical probe as in Fig. 6, instead of the small resilient probes shown in Figs. 1 and 2.

The distance between the center probe 108 and either probe 28 or 29, may be determined by contacting the gauge pin 16 in the center with each probe in succession and noting the readings of scale 49 at the instant of contact. The difference in readings on the scale 49 for the respective probes is the distance between the probes.

*Manual operation*

The gauging apparatus described above and shown in Figs. 1 and 2 may be operated manually, if desired. For manual operation, a test piece such as a turbine blade 14, for example, is inserted in the vise 13 and is clamped tightly in position by means of the clamping means 15. The knob 126 on the record drum 43 is then adjusted to bring the probe 28 to a position at which it clears the test part 14 after which the knob 125 on the control drum 36 is adjusted to bring the probe 28 to a desired measuring station. The reading of the scale 49 at the position of the indexing member is then observed. The knob 125 is then again adjusted to bring the probe 28 into engagement with the test part 14. At the instant of engagement, the stylus 44 makes a mark upon the record strip 43'.

The stylus 44 is then manually stepped over to an adjacent portion of the record strip 43' and the knob 125 on the drum 136 is adjusted to bring the probe 28 to another measuring station, whereupon the knob 126 is again manipulated as described above. This sequence of operations is repeated until gauging operations have been made at as many stations as desired. The locations of the several gauging stations may be determined by reading the calibrated markings 49 on the drum 46 at the position of the indexing member 50 at each station. Alternatively, a light similar in function to the light 110 may be added to the relay BR to indicate contact of the probe with the test part. At the instant the light goes on, the probe movement is immediately stopped and the dial 51 is read.

After one side of the test piece has been gauged as described above, the knobs 125 and 126 are both adjusted as required to bring the probe assembly to the side of the test part 14 nearest the gauging apparatus. With the probe 29 in this position, the contour of the opposite side of the test piece 14 may be gauged at a plurality of different stations in exactly the same manner as described above.

*Semi-automatic operation*

If desired, the gauging apparatus may be adapted for semi-automatic operation by opening the lead 63 and connecting the stop button 56 between the leads 66 and 80 to energize relay PI instead of the relay SP. In such case, the control drum 36 may be adjusted manually by means of the knob 125 to bring it to the desired stations, as described above. Upon arrival of the probe assembly at a selected station, however, the start button 56 is pressed to cause the offset motor 42 to advance the probe 28 into engagement with the test part 14, thereby causing the stylus 44 to make a mark on the record strip 43'. The motor automatically reverses, as described above and retracts the probe 28 from the test piece 14 until the timer T breaks the circuit to the motor 42 and brings the probe 28 to rest. Gauging operations at other stations may be conducted in a similar manner, the station positions being determined by reading the markings 49 on the drum 36 at the position of the index marker 50.

If a permanent record of the gauging stations is desired, a suitable record strip, such as Teledeltos paper, for example, may be mounted on the surface of the drum 36 and a second recording stylus 127 may be mounted so as to engage the Teledeltos paper. The stylus 127 may be electrically connected to the stylus 44 by a conductor 128 so that a mark is made on the record strip on the drum 36 at the same time as the offset mark is made upon the record strip 43'. In this fashion, the stations at which the gauging measurements are made can be accurately recorded on the record strip on the drum 36.

*Automatic operation*

The gauging apparatus is also capable of automatic operation, as described briefly below. In operation, the offset motor 42 and the station motor 32 are first operated manually by the switches 123 and 122 as required to position the measuring probe 29 in relation to the first station to be measured so that it is ahead of the first station and clear of the test piece 14. The station control drum 36 is then ahead of the first indicia 37.

The start button 56 (Fig. 1) is then pressed and the station motor 32 drives the station carriage 23 and the measuring probe 29 in the station direction until the first indicium 37 on the control drum 36 passes in front of the scanning mechanism 38. This stops the station motor 32 and the measuring probe 29 at the first predetermined station and automatically starts the offset motor 42 to drive the offset carriage 20 in the measuring direction until the measuring probe 29 comes into engagement with the test piece 14. At that instant, a mark is made on the Teledeltos paper 43' mounted on the record drum 43. The ratchet mechanism 48 then advances the stylus 44 one step and the offset motor 42 reverses its direction of travel for a predetermined time, as determined by the timer T, until the measuring probe 29 is brought clear of the test piece 14.

After the predetermined time has elapsed, the offset motor 42 stops and the station motor 32 again starts automatically and advances the station carriage 23 to bring the measuring probe 29 to the next station whereupon another measurement is made as described above. This process is repeated until the entire contour is measured on one side. The probe assembly is then brought around to the other side of the test piece 14 by manual control of the motors 42 and 32 and again positioned at the first station.

The probe selector switch 109 is thrown over to its other position corresponding to the reverse direction of measurement and the process outlined above is repeated for the opposite side of the test piece 14.

Figure 3:
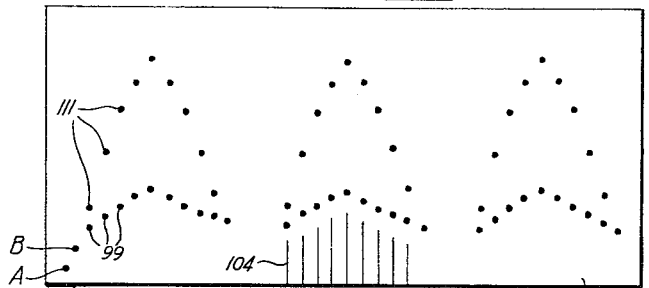
Fig. 3 is a typical record such as might be obtained with the apparatus shown in Fig. 1.
Figure 4:
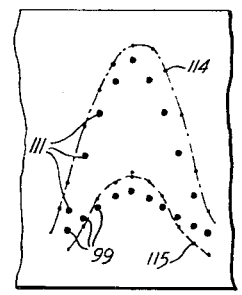
Fig. 4 is another typical record illustrating how the apparatus of Fig. 1 may be employed to obtain indications of both the shape or contour of a part and of deviations in the shape or contour of the part from a standard of reference.

Preferably, measurements are taken at different elevations by unloosening the clamp 27 and positioning the probe holder 26 vertically at the desired elevations. The records for both sides of the test part 14 at any elevation may be made side by side by allowing the stylus assembly to continue moving in one direction when going from one side to the other, or the records may be lined up so that corresponding stations occur on the same circumferential line of the record, as shown in Fig. 3. This may be accomplished by resetting the stylus assembly so that the record corresponding to the first station of the second side will be in alignment with the first station on the first side.

In Fig. 3 are shown three typical records U, M and L corresponding to upper, middle and lower elevations along the test piece 14, respectively. The lower set of marks 99 corresponds to the offsets obtained on the side of the test part 14 nearest the apparatus, while the marks 111 correspond to the offsets for the side away from the apparatus.

In Fig. 3, the position on the record strip at which the probe 29 engages the gauge pin 16 is designated by the mark A. Similarly, the mark B designates the position on the record where the probe 28 engages the opposite side of the test pin 16. It will be understood, therefore, that a line parallel to the lower edge of the record strip and passing through the mark A will serve as a base line for the offsets corresponding to the marks 99, while a similar line through the mark B will constitute a base line for the marks 111.

If desired, the apparatus described above may be employed for determining the deviations between the contour of the test part 14 and specifications for the latter. This may be accomplished by preparing in advance a record strip having marks 114 and 115 thereon which represent accurately the desired contours for the opposite sides of the test part 14, respectively. Such a record strip may be prepared by mounting it on the record drum 43, moving the stylus successively to the several gauging stations, moving the drum 43 at each station until the scale 51 at the position of the indexing member 52 corresponds exactly to the known offset for that station, and supplying electrical energy to the stylus 44 to cause it to make a mark on the record strip at that position. To this end, the stylus 44 may be provided with an auxiliary energizing circuit (not shown) adapted to be closed by a push button, for example, for this purpose. The record strip may also be prepared by running the machine automatically with a master part having the correct form in place of the test part 14.

The apparatus is lined up as described above, after which the actual offsets are recorded on the previously prepared record strip as represented by the marks 99 and 111 in Fig. 3. The marks 99 and 111 then represent the actual contours of the opposite sides of the test part 14, while the vertical distances between those marks and the corresponding marks 114 and 115, respectively, give the deviations between the two.

Since there is one circumferential line on the offset record 43' for each station, it is not necessary to provide any scale in the station direction. The lines correspond to successive stations as marked on the control drum 36. However, if the stations are uniform the scale can be determined. For example, if measurements are made ever .005" in the station direction and the ratchet mechanism 48 advances the stylus assembly .050" after each reading, then the amplification in the station direction is 10 to 1.

*Modifications*

Figure 5:
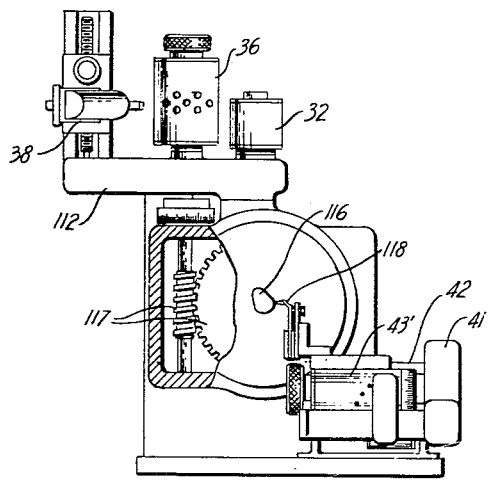
Fig. 5 illustrates schematically another embodiment of the invention which is adapted to be used for gauging objects having an axis of rotation.

The modification shown in Fig. 5 of the drawings enables accurate measurements to be obtained of the offsets of a rotating device such as a cam, for example. In this embodiment, the station motor 32 drives a cam 116, which is to be gauged, to different angular positions. The different angular positions are controlled by the drum 36 and the scanner 38 through a gear box 112 and worm gear 117. At each position, a probe 118 is adapted to be moved into engagement with the cam 116 to produce a mark on the record strip 43' at the instant of engagement. The control system shown in Fig. 1 and described above may be employed for imparting the proper movements automatically to the station motor 32 and to the offset motor 42. The same type of record is formed with this apparatus as that shown in Fig. 3, except that each station corresponds to an angular position instead of a linear station position. From a record of this type the actual contour of the cam 116 can be readily determined.

Figure 6:
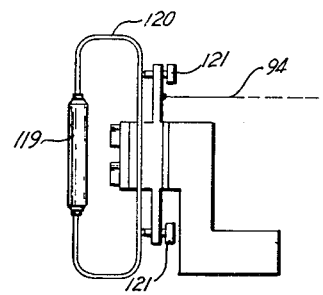
Fig. 6 is a view in elevation of a modified form of probe design for measuring linear displacements such as the displacement of a tappet by a cam, for example.

By using the modified form of probe shown in Fig. 6, the apparatus of Fig. 5 may be employed to determine the travel of a moving element such as a tappet as normally used in conjunction with a cam in internal combustion engines, for example. The probe in Fig. 6 may comprise, for example, a cylindrical rod 119 of very accurate dimensions resiliently mounted in any suitable manner in an adjustable support 120 and secured to the offset carriage 20. Adjusting screws 121 are provided to facilitate positioning the rod 119 so that the direction of its longitudinal axis corresponds to the flat face of the corresponding tappet. After this adjustment has been made, measurements are carried out essentially in the manner described above. The record obtained with this modification will then correspond to the motion of the tappet, rather than to the contour of the cam. By using an appropriately shaped probe, the movement of any type follower may readily be produced on the record 43'.

While, in Figs. 1 and 2, the probes 28 and 29 are shown pointing away from one another, in certain cases as where it is desired to gauge a gear tooth, for example, it may be advantageous to mount the probes 28 and 29 so that they are directed towards one another. In gauging a gear tooth by means of inwardly directed probes, the probes should be spaced apart from one another a distance greater than the thickness of the gear tooth. Further, the probe 28 should be connected so as to energize the stylus 44, as described above, while the probe 29 should be connected to a second stylus (not shown) preferably mounted at the same position on the record strip 43' as the stylus 44.

In operation, the probe assembly is moved either manually or automatically as described above, to bring the probe 28 into engagement with one side of the gear tooth at which time the stylus 44 will make a mark upon the record strip 43'. The movement of the probe assembly is then reversed until the probe 29 makes contact with the opposite side of the gear tooth, at which time the second stylus (not shown) makes a mark upon the record strip 43'. It will be understood that the distance between the two marks is characteristic of the thickness of the tooth measured at this point.

In practice, a master tooth is first gauged and the distance around the record strip 43' between the two marks made by the two probes is accurately determined. The tooth to be measured is then gauged in the same way, thus producing another pair of different marks on the record strip 43'. If the distance between the latter two marks is the same as the distance between the first two marks for the master tooth, then the tooth to be measured has exactly the same thickness as the master tooth at the gauging position. If, however, the distance between the second pair of marks is greater or less than the distance between the first two marks, this indicates that the tooth to be measured is thicker or thinner than the master tooth by a definite amount.

In order to avoid the necessity for looking around the drum to find the second point, the second stylus (not shown) may be made adjustable around the drum 43 relatively to the stylus 44. With this construction, if the second stylus is moved away from the first stylus a distance equal to the distance between the two points on the record strip corresponding to the thickness of the master tooth, it will be understood that if the tooth to be measured has the same thickness as the master tooth at the gauging position, the mark made by the second stylus will be at exactly the same circumferential position on the record strip 43 as the mark made by the stylus 44', but will be axially spaced apart therefrom by a small distance. If the thickness of the tooth to be measured differs from the thickness of the master tooth, therefore, the distance between the first and second marks made on the record strip 43' will correspond to the deviation between the two. This adjustment may also be effected partly or wholly by moving the probes relatively to one another, although the stylus adjustment is preferred because of the much coarser adjustment available as a result of the amplification present in the recording apparatus. This adjustment also affords an effective means of lining up a plurality of probes prior to a measuring operation.

In order to facilitate locating the records made on the record strip, an auxiliary stylus 58 may be attached to the stylus 44 (Fig. 1) so as to trail it in the direction of rotation, if desired. The stylus 58 may be connected through the lead 97 to the positive terminal of the high voltage power supply of the amplifier 95. The stylus 58 makes a continuous trace 104 (Fig. 3) on the record strip 43' as the drum 43 rotates. Since the drum 43 reverses as soon as a mark 99 is made, the trace 104 will stop short of the mark 99, as shown, and will act as an indicator to successive marks 99.

It will be understood from the foregoing description that the invention provides a novel and highly effective apparatus by means of which the distances between a reference datum and points on the contour of an object may be accurately determined. By virtue of the construction described above, the gauging operations are performed automatically so that high speeds of operation may be achieved without impairing the accuracy of measurement.

The several embodiments described above and illustrated in the drawings are intended to be merely illustrative, and are not to be regarded as restricting in any way the scope of the following claims.

We claim:

1. In measuring apparatus, the combination of resilient probe means, first motive means for positioning said probe means successively at different measuring stations with respect to an object to be measured, control means driven by said first motive means and bearing indicia corresponding to said measuring stations, means for scanning said indicia, second motive means for advancing said probe means relatively to the object to bring the two into engagement, a record strip, recording means directly coupled to said second motive means for advancing said record strip relatively to the recording means in strict accordance with the advancement of said probe means with respect to the object, first electrical means responsive to engagement of said probe means with the object for causing said recording means to record on the record strip, second electrical means responsive to engagement of said probe means with the object for reversing said second motive means to withdraw said probe means from the object, means rendered operative at a predetermined time following initiation of the withdrawal of said probe means for deactivating said second motive means and for activating said first motive means, and means responsive to the scanning of one of said control means indicia by said scanning means for deactivating said first motive means and for activating said second motive means.

2. In measuring apparatus, the combination of a support for an object to be measured, first and second carriages mounted for relative linear sliding movement in mutually perpendicular directions, one of said carriages being movable towards and away from the object and the other of said carriages being movable to different measuring stations with respect to the object, resilient probe means mounted on said one carriage, first electrical motive means for moving said other carriage successively to said different stations, drum means driven by said first motive means and bearing indicia thereon corresponding to said different stations, means for scanning said indicia, second electrical motive means for advancing said one carriage to bring the probe means thereon into engagement with the object, a record drum carrying a record strip thereon and directly coupled to said second motive means for rotation thereof in strict accordance with the advancement of said probe means, recording means, first electrical means responsive to engagement of said probe means with the object for causing said recording means to record on said record strip, second electrical means responsive to engagement of said probe means with the object for reversing said second motive means to withdraw said probe means from the object, means rendered operative at a predetermined time after initiation of withdrawal of said probe means for deactivating said second probe means and for activating said first motive means to move said probe means to another station, and means responsive to scanning one of the indicia on said drum means by said scanning means for deactivating said first motive means and for activating said second motive means to advance said probe means towards the object.

3. In measuring apparatus, the combination of a support for an object to be measured, first and second carriages mounted for relative linear sliding movement in mutually perpendicular directions, one of said carriages being movable towards and away from the object and the other of said carriages being movable to different measuring stations with respect to the object, resilient probe means mounted on said one carriage, first electrical motive means for moving said other carriage successively to said different stations, drum means driven by said first motive means and bearing indicia thereon corresponding to said different stations, means for scanning said indicia, means forming a scale about the periphery of said drum means, indexing means stationary with respect to said drum means and adapted to cooperate with the scale formed thereon to indicate positions of said drum means, second electrical motive means for advancing said one carriage to bring the probe means thereon into engagement with the object, a record drum carrying a record strip thereon and directly coupled to said second motive means for rotation thereof in strict accordance with the advancement of said probe means, recording means, means forming a scale about the periphery of said record drum, indexing means stationary with respect to said record drum and adapted to cooperate with the scale formed thereon to indicate positions of said record drum, first electrical means responsive to engagement of said probe means with the object for causing said recording means to record on said record strip, second electrical means responsive to engagement of said probe means with the object for reversing said second motive means to withdraw said probe means from the object, means rendered operative at a predetermined time after initiation of withdrawal of said probe means for deactivating said second probe means and for activating said first motive means to move said probe means to another station, and means responsive to scanning one of the indicia on said drum means by said scanning means for deactivating said first motive means and for activating said second motive means to advance said probe means towards the object.

References Cited in the file of this patent

UNITED STATES PATENTS

| Number | Name | Date |
|---|---|---|
| Re. 22,953 | Praeg | Dec. 23, 1947 |
| 992,926 | Updegraff | May 23, 1911 |
| 1,619,483 | Olson | Mar. 11, 1927 |
| 1,826,527 | Schlaupitz | Oct. 6, 1931 |
| 1,924,260 | Shippy | Aug. 29, 1933 |
| 2,018,399 | Engst | Oct. 22, 1935 |
| 2,047,408 | Emery | July 14, 1936 |
| 2,056,918 | Bristol | Oct. 6, 1936 |
| 2,150,070 | Kregecz | Mar. 7, 1939 |
| 2,248,973 | Eby | July 15, 1941 |
| 2,281,960 | Vacquier | May 5, 1942 |
| 2,311,804 | Wright | Feb. 23, 1943 |
| 2,322,343 | Brandon | June 22, 1943 |
| 2,380,436 | Holdman | July 31, 1945 |
| 2,397,108 | Hanna | Mar. 26, 1946 |
| 2,483,333 | Cannon, Jr. | Sept. 27, 1949 |
| 2,495,891 | Davis | Jan. 31, 1950 |
| 2,648,912 | Osgood | Aug. 18, 1953 |
| 2,697,879 | Tandler et al. | Dec. 28, 1954 |

FOREIGN PATENTS

| 591,197 | Great Britain | Aug. 11, 1947 |